(12) United States Patent
Turner et al.

(10) Patent No.: US 7,670,103 B2
(45) Date of Patent: Mar. 2, 2010

(54) MOUNTING ARRANGEMENT FOR TURBINE BLADES

(75) Inventors: Lynne H Turner, Bristol (GB); Paul W Ferra, Derby (GB)

(73) Assignee: Rolls-Royce plc, London (GB)

( * ) Notice: Subject to any disclaimer, the term of this patent is extended or adjusted under 35 U.S.C. 154(b) by 741 days.

(21) Appl. No.: 11/474,370

(22) Filed: Jun. 26, 2006

(65) Prior Publication Data
US 2007/0003407 A1 Jan. 4, 2007

(30) Foreign Application Priority Data
Jul. 1, 2005 (GB) .................... 0513468.9

(51) Int. Cl.
*F01D 5/08* (2006.01)
(52) U.S. Cl. ...................... 415/115; 415/116
(58) Field of Classification Search ................. 415/115, 415/116; 416/97 R, 244 A
See application file for complete search history.

(56) References Cited

U.S. PATENT DOCUMENTS 3,989,410 A 11/1976 Ferrari 5,800,125 A * 9/1998 Largillier et al. .......... 416/96 R
5,957,660 A 9/1999 Evans

FOREIGN PATENT DOCUMENTS

EP 0 926 315 A 8/2000

* cited by examiner

*Primary Examiner*—Edward Look
*Assistant Examiner*—Dwayne J White
(74) *Attorney, Agent, or Firm*—Jeffrey S. Melcher; Manelli Denison & Selter PLLC

(57) ABSTRACT

In order to improve cooling of a blade 31, 41/disc 32, 42 combination, a pre-swirler feature 40, 50 is utilised in order to present coolant air through presentational pathways typically incorporating holes 37 or grooves/slots such that coolant air displaces hotter air leaked past a seal 35, 45. The swirler features 40, 50 are located within stationary housing components 34, 44 such that the coolant air is propelled at substantially the same rotational speed as the disc 32, 42 whilst presentation of the coolant air flow A, C, E is such that hot air displacement is achieved at least adjacent front faces 36, 46 of blade roots 33, 43.

10 Claims, 4 Drawing Sheets

MOUNTING ARRANGEMENT FOR TURBINE BLADES

FIELD OF THE INVENTION

The present invention relates to mounting arrangements for turbine blades in an engine and more particularly to providing an arrangement for more effective cooling of the disc.

BACKGROUND OF THE INVENTION

Operation of turbine engines is well known in order to provide propulsion for aircraft.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

The present invention in particular relates to mounting arrangements for turbine blades in order to provide more efficient cooling of the disc.

FIG. 2 is a schematic perspective view of a prior nozzle guide vane and turbine vane cooling arrangement. The present invention particularly relates to mounting arrangements for turbine blades 118. As can be seen, high pressure coolant air 100 passes through apertures 101 and pre-swirler nozzles 102 into a plenum chamber 103 where it is distributed to root galleries 104 at the base of each blade 118. It will also be understood that coolant air 107, 108, 109 is presented through apertures in guide nozzles 110 and the blades 118 in order to provide surface cooling for these components.

It will be understood that high engine thermal efficiency is dependent upon high turbine entry temperatures which in turn is limited by the material properties of the turbine blades and nozzle guide vane materials. It is for these reasons that cooling is provided within a turbine engine. Furthermore, it will be appreciated that there is heat conduction and convection from the turbine blades 118 to the turbine disc 111 upon which the blades 118 are secured. Typically, in order to achieve cooling, multi-pass coolant systems are provided in which coolant air flows are controlled and regulated through passageways, apertures and nozzles in order to maximise the cooling effect. For example, the pre swirler nozzles 102 act to reduce temperature and pressure of the cooling air flow 100 as it is presented to the rotor disc assembly for cooling purposes.

A particular problem relates to the space, commonly referred to as the wheel space, in front of and behind each rotor disc assembly upon which turbine blades are secured. In short, the air within these spaces has tended to be warmed and is of lower cooling quality due to passing through a rotor stator cavity where it has been exposed to windage and drag from the static components adjacent to the rotor disc. It will be understood for cooling efficiency, it is desirable for there to be a positive flow of relatively cool air. Unfortunately, in some previous arrangements for cooling the blade platform 106 and disc air has been taken from these fore and aft wheel spaces with the result that inefficient cooling has occurred. It will be understood in engines where there is no cooling passage, ingress of air from the relatively hot spaces in front of the blade pocket 105 and its substantial retention and re-circulation within that pocket 105 contributes significantly to high disc 111 temperatures which in turn may limit acceptable gas path temperatures attainable by an engine or reduce effective operational component lifes in the engine.

In order to avoid this particular problem, previous solutions have included adding mechanical features to the front and rear of the disc 111 in order to effectively seal the blade pocket 105 from ingress of the relatively hot wheel space air whilst providing a separate supply of cooling air to cool the blade platform and disc 111 itself. Nevertheless, it will still be appreciated that problems can still arise with high temperatures in the blade pocket 105 leading to higher operating temperatures or restrictions on engine efficiency or limited component life. Furthermore, such mechanical features add to design and assembly complexities as well as weight.

The air flow blowing up the front face of a high pressure turbine disc formed by the front face of that disc and the blade mounting firtree is normally the efflux from a rotary seal which is typically of a labyrinth type. Having flowed through the seal, this airflow impinging upon the front face has been heated and has a tangential velocity in the direction of the rotation of the disc which is less than that of the disc. The result is that there is a raised environmental disc temperature due to the air picking up heat at the seal and the energy input required to bring this air up to disc velocity at the boundary layer with the front face of the high pressure turbine disc.

SUMMARY OF THE INVENTION

In accordance with the present invention there is provided a mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, but the housing including a swirler feature whereby coolant air is appropriately propelled towards disc rotational velocity through a presentational pathway in order to at least displace the relatively hot air leakage adjacent the front face.

Possibly, the pathway includes holes in a seal arm forming the seal.

Generally, the arrangement includes a cover plate engaging the front face. Possibly, the presentational pathway includes holes in the cover plate. Furthermore, the cover plate may include grooves or slots in an abutment surface of a cover plate in engagement with the front face in order to present coolant air flow. There may be holes in the cover plate located upstream of a bucket groove and downstream of a receiving hole for a cover plate plenum cavity. There may be holes in a rear seal plate to present coolant air flow from the bucket groove to a back face of at least the disc. Possibly, there are grooves or slots in the disc or blade surfaces themselves which constitute the front face of the arrangement. Further alternatively there may be protrusions upon the front face in order to facilitate presentation of the coolant air flow.

Advantageously, the presentational pathway may be angled or formed tangentially for effective presentation of the coolant air flow to the front face.

Also, in accordance with the present invention there is provided a turbine engine including a mounting arrangement as described above.

BRIEF DESCRIPTION OF THE DRAWINGS

Embodiments of the present invention will now be described by way of example and with reference to the accompanying drawings in which.

DETAILED DESCRIPTION OF THE INVENTION

Figure 1:
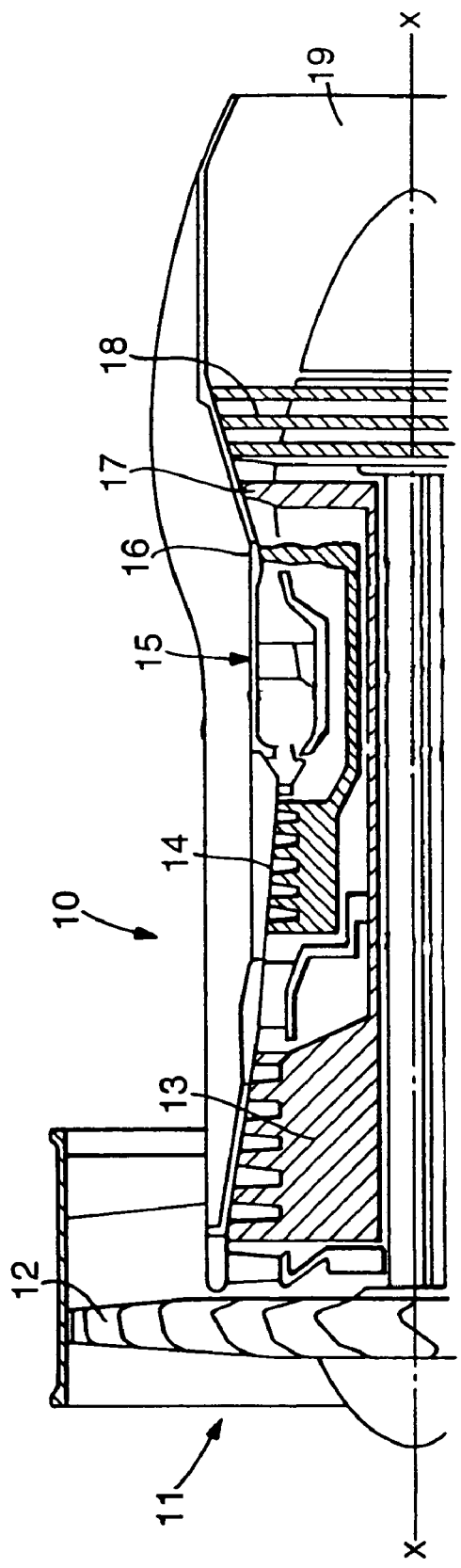
FIG. 1 is a diagrammatic cross-sectional view of a gas turbine engine.
Figure 2:
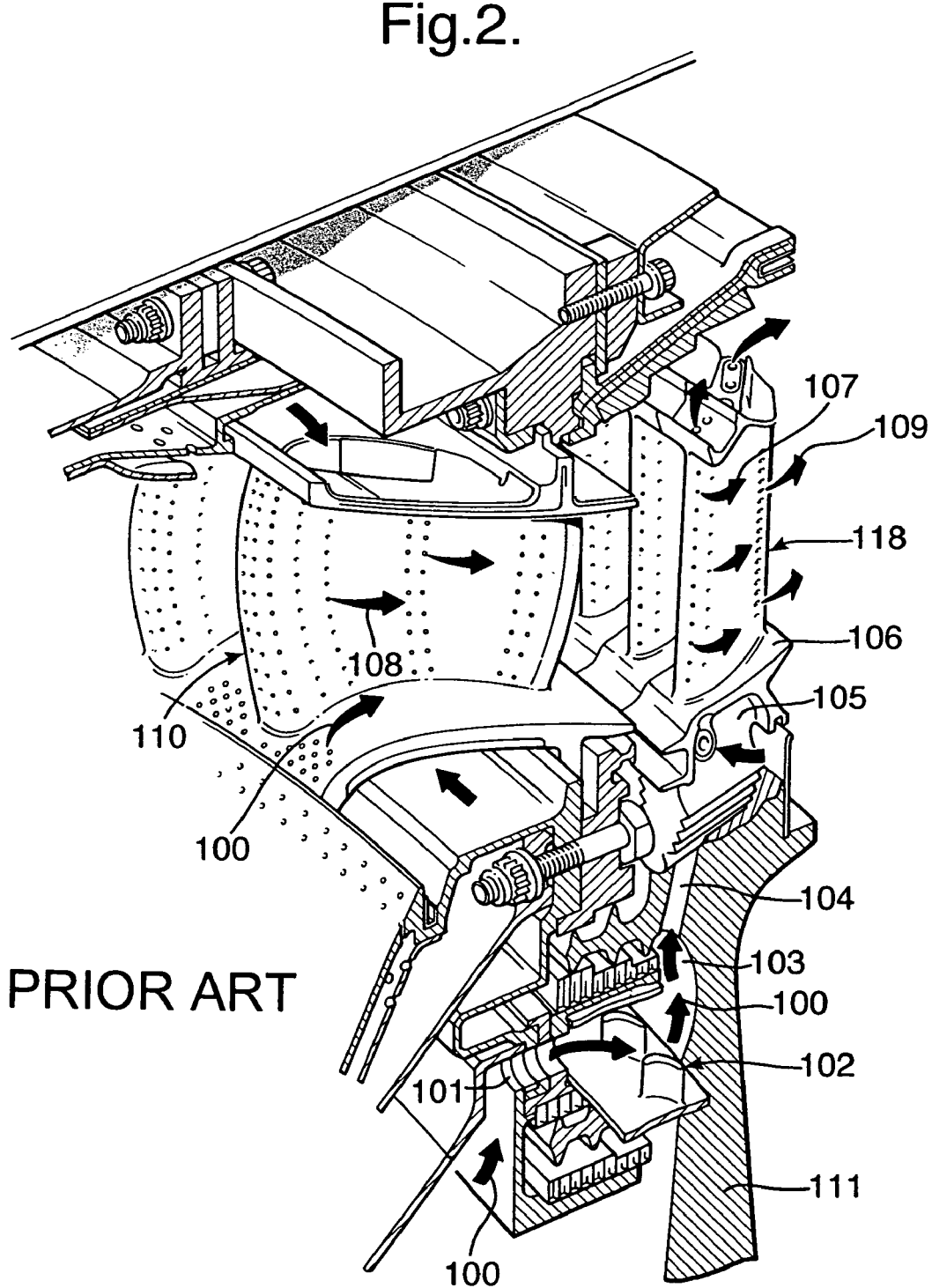
FIG. 2 is a schematic perspective view of a prior nozzle guide vane and turbine vane cooling arrangement.
Figure 3:
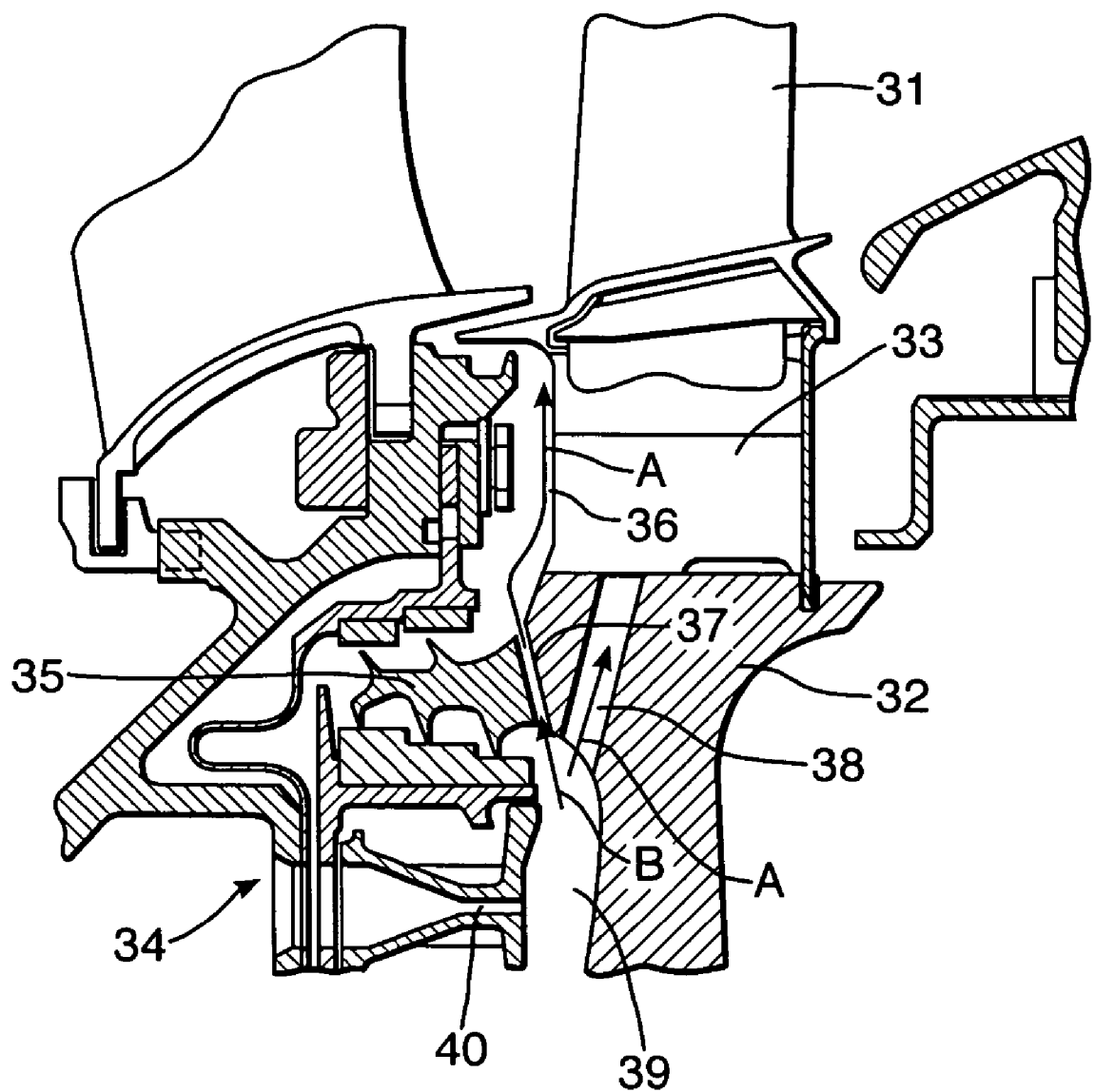
FIG. 3 is a cross-section of a first embodiment of a mounting arrangement in accordance with the present invention.

FIG. 3 illustrates a typical turbine blade mounting arrangement utilised in a turbine engine. Thus, a turbine blade 31 is mounted upon a turbine disc 32 through a firtree mounting 33. The disc 32 and blade 31 are assembled such that they rotate as a combination about a shaft (not shown) relative to substantially stable housing components 34. A seal 35 of a labyrinthine type is provided between the blade 31/disc 32 assembly and the stationary housing components 34. It will be appreciated that it is leakage of heated air passed this seal 35 such that it becomes incident upon a front face 36 of the turbine blade root 33 which inhibits heat control. It will be understood that leakage past the seal 35 is inherently of a relatively slow nature such that the air leaking past the seal 35 lingers and so becomes heated by the surrounding components.

In accordance with the present invention, holes 37 are provided upstream of a receiving hole 38 from a plenum chamber 39 between the housing components 34 and the disc 32. Particularly in accordance with the present invention, a pre-swirler feature 40 in the housing components 34 acts to provide for propulsion of coolant air flow taken from the normal coolant system into the chamber 39 such that, as illustrated by arrowheads A and B, coolant air can pass through the receiving hole 38 into the typical coolant bucket groove for the root 33 (flow B) and also through the hole 37 (flow A) respectively. The present invention particularly relates to the coolant air flow presented and propelled through the hole 37 such that it displaces and replaces relatively hot leakage air past the seal 35 in order that the front face 36 at least is better cooled.

The size and distribution of holes 37 is dependent upon particular requirements in terms of operational temperatures and air flow rates. Generally, holes 37 will be provided at spaced positions circumferentially about the disc 32. In particular, as can be seen the seal 35 is formed in an arm of the disc 32 and the holes 37 will be formed in a base portion of that arm.

The holes 37 will be angled or tangentially presented in order to achieve the surface layer displacement at least relative to the front face 36 of the blade 31/disc 32 combination.

The air flow (arrowhead A) at the front face 36 is preferably at a rotational velocity equal to or close to the disc 32 speed. The air flow originates from the swirler 40 into the cavity 39 with an increased velocity such that air bled through the hole 37 passes directly into impingement upon the front surface 36 whilst seal 35 still retains turbine blade 31/root 32 isolation.

To reduce air temperature presented in the flow (arrowhead A), that flow is passed through the swirler 40 in a number of nozzles appropriately positioned in order to increase the tangential velocity close to that of the rotational speed of the disc 32. As the flow (A) passes into incidence upon the disc via a receiving hole 38 and into a bucket groove, the relative air temperature, that is to say the temperature experienced when travelling at the rotational velocity of the disc, is lower than that absolute temperature of the air flow (A) upstream of the rotator component, that is to say the air temperature experienced by the static housing components 34. By diluting the hotter air which would be presented to the front of the face 36 with coolant air directly passed through the holes 37, it will be understood that lower disc 32 temperatures are achieved greatly increasing component life.

Figure 4:
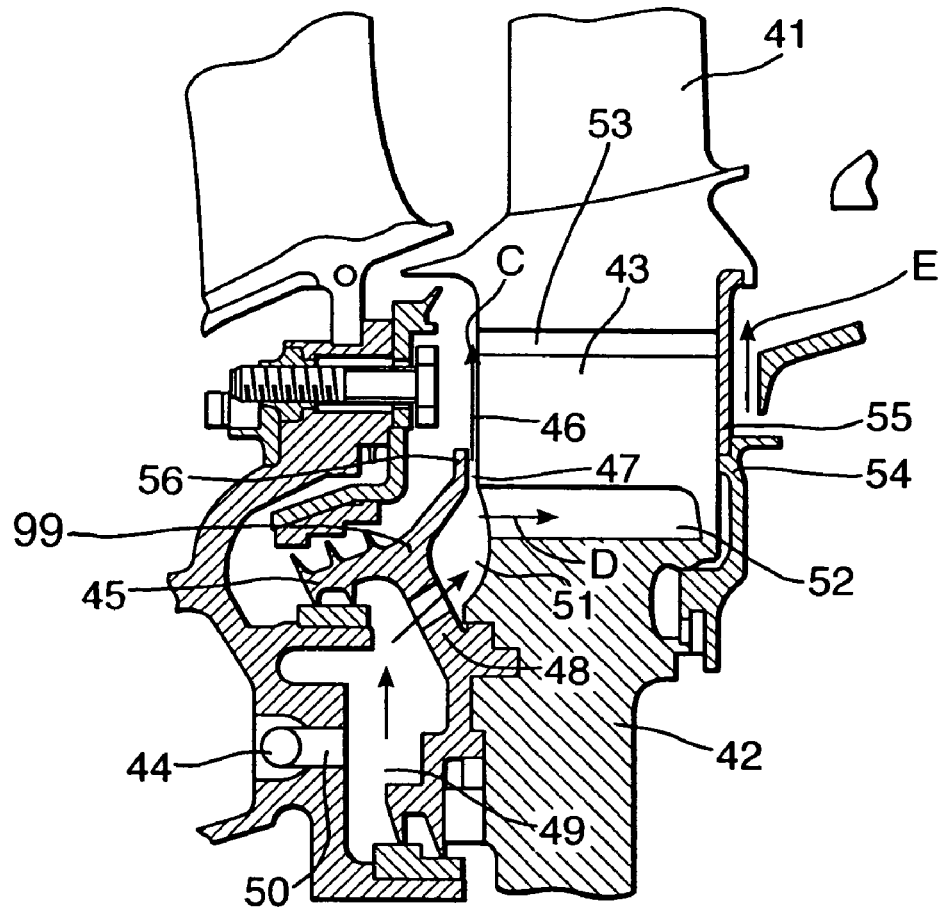
FIG. 4 is a cross-section of a second embodiment of a mounting arrangement in accordance with the present invention; and, FIG. 5 is a cross-section in the plane E-E depicted in FIG. 4.

FIG. 4 illustrates a second embodiment of a mounting arrangement in accordance with the present invention. Thus, a turbine blade 41 is again secured upon a disc 42 with a root 43 and a cover plate 99 incorporating a seal 45 acting in association with stationary housing components 44 in order to isolate the blade 41/disc 42 combination despite rotation upon a shaft (not shown). In accordance with the present invention, a pre-swirler feature 50 presents coolant air from an existent cooling system into a plenum chamber 49 and then via a receiving hole 48 to a chamber 51 between the cover plate 99 and the disc 42 such that coolant air flows into a groove 52 and through a hole 47. The present invention particularly relates to the holes or grooves 47 such that a coolant air flow depicted as arrowhead C is presented adjacent a front face 46 of the blade 41/disc 42 combination. In such circumstances, the coolant air flow C forms a cold film between the relatively hot air leaked past the seal 45 and the disc/blade combination such that the combination is cooled. The coolant air may also then pass through a further gallery 53 in order to further increase cooling of the blade 41/root 43.

Also, in accordance with the present invention, coolant air in the direction of arrowhead D passes through the groove 52 into a chamber formed with a rear seal plate 54. Thus, through grooves in a rear seal plate 54 a further coolant air flow, depicted by arrowhead E, is provided to cool a rear surface 55 of the blade 41/disc 42 combination.

Figure 5:
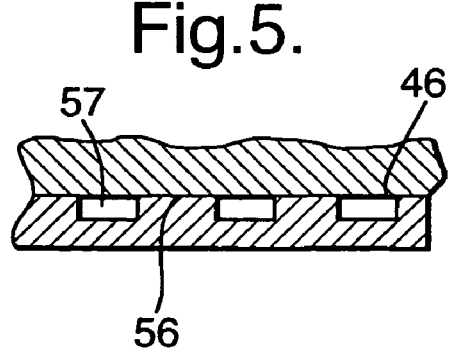

Typically, in order to allow ease of construction and fabrication, an abutting surface 56 incorporates grooves or slots through which the coolant air flow passes to lie adjacent to the front surface 46, or rear surface 55. FIG. 5 illustrates a segment of an abutment surface 56 incorporating grooves 57 as described above. In such circumstances, the abutment surface 56 is in contact with the front face 46 such that coolant air can pass through the grooves 57, which in association with the face 46 provides a closed channel, in order to lie against at least that surface 46 in order to displace hotter air and therefore provide improved cooling of the blade 41/disc 42 combination.

It is by provision of the propulsive effect of the pre-swirlers 40, 50 in accordance with the present invention that appropriate speed for presentation of the coolant air flows A, C upon their respective front faces 36, 46 is achieved. Without such swirler features 40, 50 it will be appreciated that there would simply be dispersive flow through the holes 37, 47.

Additionally, it will be understood that ribbing or protuberances may be provided within the holes 37 or grooves/slots in order to angularly or tangentially present the coolant air flows A, C as required for best efficiency in terms of cooling the blade 41/disc 42 combination. Furthermore, such protuberances can be provided in the faces 36, 46 of the blade root 43 as well as the rear surface 55 in order to further enhance coolant air retention near to those faces 36, 46 or 55. The particular dimensions and distribution of such protuberances will be chosen in order to achieve best efficiency in a particular operational environment in terms of temperature and desired performance.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A mounting arrangement for a turbine engine blade in an engine, the arrangement comprising:
   a turbine disc and turbine blade arranged to rotate relative to a stationary housing with a seal therebetween;
   a front face of at least that disc being incident to relatively hot air leakage from the seal;
   a plenum chamber; and
   a swirler feature whereby coolant air is appropriately propelled into said plenum chamber from said swirler feature towards disc rotational velocity, holes being defined in said arrangement to exhaust air from said plenum chamber through a presentational pathway in order to at least displace the relatively hot air leakage adjacent the front face, wherein said seal includes a seal arm and the pathway includes said holes in said seal arm forming the seal.

2. An arrangement as claimed in claim 1 wherein the arrangement includes a cover plate engaging the front face.

3. An arrangement as claimed in claim 1 wherein the presentational pathway is angled tangentially for effective presentation of the coolant air flow to the front face.

4. A turbine engine including a mounting arrangement as claimed in claim 1.

5. A mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, the housing including a swirler feature whereby coolant air is appropriately propelled towards disc rotational velocity through a presentational pathway in order to at least displace the relatively hot air leakage adjacent the front face wherein the arrangement includes a cover plate engaging the front face and wherein the presentational pathway includes holes in the cover plate.

6. A mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, the housing including a swirler feature whereby coolant air is appropriately propelled towards disc rotational velocity through a presentational pathway in order to at least displace the relatively hot air leakage adjacent the front face wherein the arrangement includes a cover plate engaging the front face and wherein the cover plate includes one of grooves and slots in an abutment surface of the cover plate in engagement with the front face in order to present coolant air flow.

7. A mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, the housing including a swirler feature whereby coolant air is appropriately propelled towards disc rotational velocity through a presentational pathway in order to at least displace the relatively hot air leakage adjacent the front face wherein the arrangement includes a cover plate engaging the front face and wherein there are holes in the cover plate located upstream of a bucket groove and downstream of a receiving hole for a cover plate plenum cavity.

8. An arrangement as claimed in claim 7 wherein there are holes in a rear seal plate to present coolant air flow from the bucket groove to a back face of at least the disc.

9. A mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, the housing including a swirler feature whereby coolant air is appropriately propelled towards disc rotational velocity through a presentational pathway in order to at least displace the relatively hot air leakage adjacent the front face wherein there are one of grooves and slots in one of the disc and blade surfaces themselves which constitute the front face of the arrangement.

10. A mounting arrangement for a turbine engine blade in an engine, the arrangement comprising a turbine disc and turbine blade arranged to rotate relative to a stationary housing with a seal therebetween, a front face of at least that disc being incident to relatively hot air leakage from the seal, the housing including a swirler feature whereby coolant air is appropriately propelled towards disc rotational velocity through a presentational pathway in order to at least displace the relatively hot air leakage adjacent the front face wherein there are protrusions upon the front face in order to facilitate presentation of the coolant air flow.

* * * * *